Jan. 26, 1965 A. R. BENTSEN 3,167,314

PORTABLE PHONOGRAPH

Filed June 1, 1962

INVENTOR:
ARTHUR R. BENTSEN,

BY *Norman C. Fulmer*

HIS ATTORNEY

United States Patent Office 3,167,314
Patented Jan. 26, 1965

3,167,314

PORTABLE PHONOGRAPH

Arthur R. Bentsen, Liverpool, N.Y., assignor to General Electric Company, a corporation of New York Filed June 1, 1962, Ser. No. 199,343
7 Claims. (Cl. 274—2)

This invention relates to phonographs, and particularly to portable stereo phonographs.

Various arrangements have been devised for portable stereo phonographs, and generally are concerned with ways of attaching and using a pair of stereo loudspeakers. In some of these arrangements the loudspeakers are located in small cabinets intended to be separated and spaced from the phonograph when in use. In still other stereo phonographs, one loudspeaker is located in the phonograph proper, and the other loudspeaker is contained in a removable cover member. These arrangements frequently result in inconvenience, awkwardness, and unsightly appearance, and furthermore these arrangements sometimes are such as to make it awkward or difficult to properly position the two loudspeakers for balanced stereo effect.

An object of the invention is to provide a new and improved portable stereo phonograph.

Another object is to provide a portable stereo phonograph which is convenient to place into operative position.

A still further object is to provide a compact portable stereo phonograph which has the general shape of a suitcase for easy portability.

Still other objects will be apparent from the following description and claims, and from the drawing in which:

The portable stereo phonograph of the invention comprises, basically and in its preferred embodiment, a case resembling a suitcase and containing a tiltable record player adapted to be tilted down and outwardly from the case to the horizontal position for use, and further adapted to be tilted to a vertical position in the case for storing or carrying. A pair of loudspeaker units or enclosures are respectively hinged at the ends of the case and adapted to swing forwardly of the case so as to flank the record player when in operative position. In addition to its features of compactness, convenience and portability, the suitcase-like phonograph of the invention is adapted to rest on its bottom at all times, both when in use and when not in use, thereby avoiding the necessity of tipping the entire case to rest on a different side thereof when playing than when being carried or stored.

Figures 3, 4, 5:
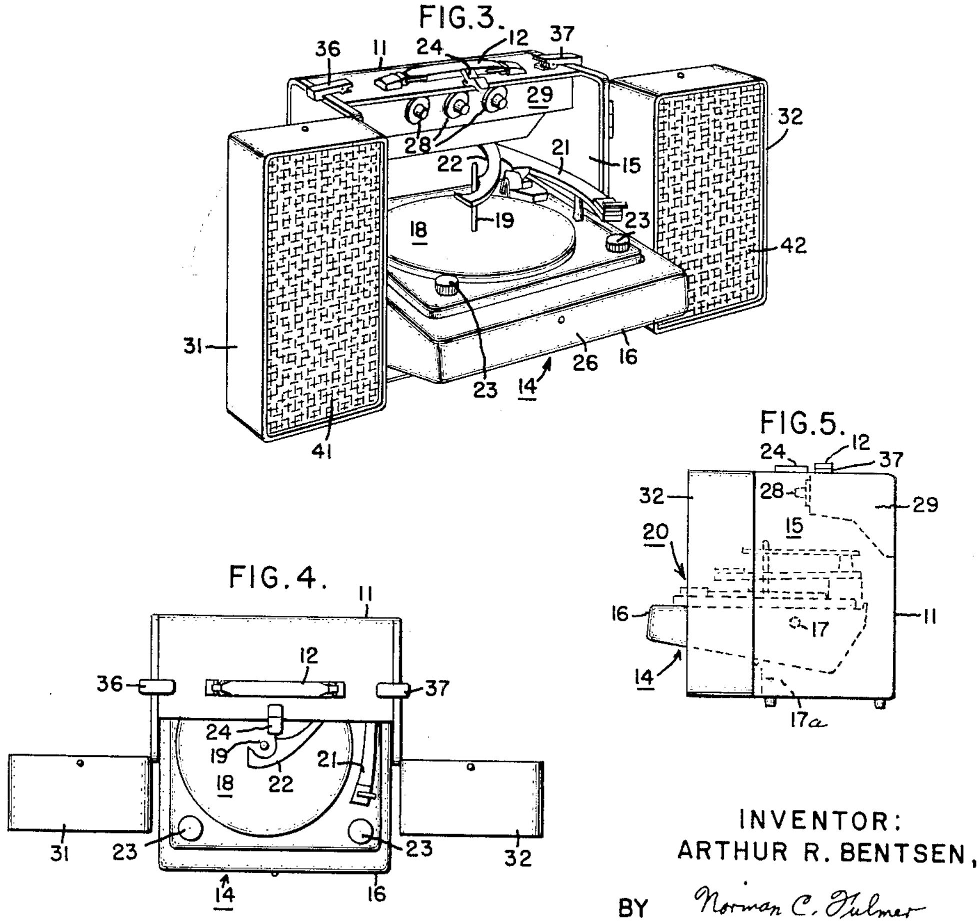
FIG. 3 is a perspective view the same as FIG. 2, except with a pair of hinged loudspeakers in operative position.
FIG. 4 is a top view of FIG. 3.
FIG. 5 is a side view of FIG. 3, looking toward the right-hand side thereof.

Now referring to the drawings, the phonograph comprises a case 11 provided with a carrying handle 12 on the top side thereof, and containing a tiltable record player unit 14 positioned in an opening 15 at the front of the case 11. The record player 14 comprises a base 16 pivotally attached to the case 11 by means of pivot members 17, best shown in FIG. 5, so that when the base 16 is tilted to the vertical position its bottom becomes the front of the case 11, and when tilted to the horizontal position it will protrude outwardly from the case 11. Thus, as shown in FIGS. 3 and 5, the record player 14 is arranged to pivot by means of pivot members 17 about a horizontal axis spaced inwardly from the front of case 11. In the illustrated embodiment of my invention, to help facilitate the generally downward tilting movement of the record player from its vertical to its horizontal position, the horizontal axis for pivotal movement of the record player 14 is also located, as shown in FIG. 5, in the lower half of the case 11. When the record player 14 is in its horizontal position (as shown in FIG. 5), a substantial portion thereof is, therefore, located within opening 15 of the case 11. Suitable stop members, not shown, may be provided for the horizontal positioning of the base 16, or a lip 17*a* at the lower part of the front of the cabinet 11 may function as a stop for proper horizontal positioning of the base 16.

A record player mechanism 20, shown in the drawing as being of a record changing type, is carried by the base 16, and comprises the usual turntable 18, record centering spindle 19, tone arm 21, overarm 22, and one or more control knobs 23. A catch 24 may be provided to lock the record player in the vertical or closed position.

Figure 1:
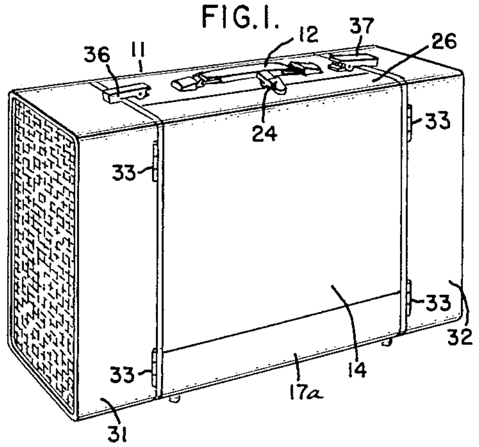
FIG. 1 is a perspective view of a preferred embodiment of the invention, shown in the closed or carrying position.
Figure 2:
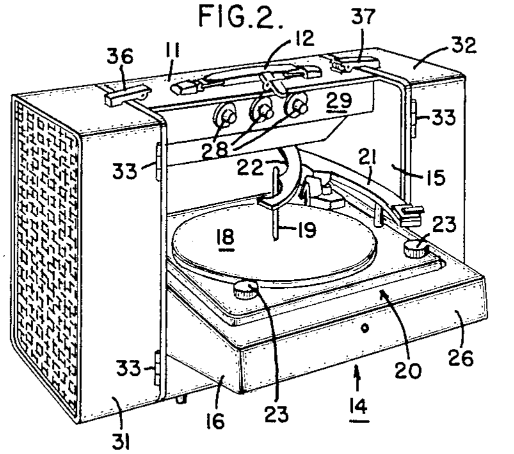
FIG. 2 is a perspective view the same as FIG. 1, but with the record player of the phonograph in operating position.

The front portion of the top of the case 11 is cut away to form a further opening integral with the front opening 15, to provide easier access to the record player mechanism when in use, and the front part 26 of the record player base 16 fills into this cut-out portion when in closed position, as shown in FIG. 1. Preferably the base 16 is tapered, as shown, so that the front 26 thereof is narrower or thinner than the rest of the base. This provides a pleasing appearance, and permits the rear part of the base to be thick enough to accommodate the phonograph motor (not shown). The tapered base 16 also causes the record player mechanism 20 to be slightly tilted from the vertical when in closed position, thereby achieving better balance thereof and less strain on the pivots 17.

Control knobs 28 or other suitable control means for the phonograph amplifier are provided at the front of an amplifier compartment 29, located beneath the top of the case 11 as shown. The knobs 28 are readily accessible through the opening. Flexible wires (not shown) extend from the record player 14 to the amplifier compartment 29. The aforesaid tapering of the base 16, which causes the record player mechanism to be slightly tilted from the vertical when closed, insures that the closed record player mechanism will be clear of the control knobs 28.

A pair of loudspeaker enclosures 31, 32 are respectively positioned at the ends of the case 11, and are attached thereto by means of hinges 33 at the front side of the case 11. These hinges 33 may serve as electrical connections to the loudspeakers, in lieu of wires. The loudspeaker enclosures 31, 32 are held in closed position by means of latches 36, 37. The loudspeaker enclosures 31, 32 have approximately the same cross-sectional dimensions as does the case 11 (when the record player 14 is in closed position), whereby the phonograph resembles a suitcase, as shown in FIG. 1, for easy portability or storage.

To place the phonograph into operation, the record player 14 is tilted down and outwardly to the position shown in FIG. 3, and the loudspeaker enclosures 31, 32 are swung outwardly and forwardly of the case 11, to the position shown in FIG. 3. The front surfaces of the loudspeaker enclosures 31, 32 (when in open position) are provided with grill cloth 41, 42, so that sound from one or more loudspeakers contained therein can readily radiate frontwardly when in use.

The arrangement whereby the loudspeaker units 31, 32 swing forwardly to flank the record player 14 when in operative position is convenient to manipulate, provides a pleasing appearance, and insures a balanced location of the loudspeaker units with respect to the phonograph, thereby insuring balanced stereophonic sound effect. This arrangement is also suitable for monaural use, with the monaural sound emanating from either or both of the loudspeaker units.

It should readily be appreciated that I have provided a new and improved phonograph which is readily portable due to its being in the general size and shape of a suitcase when in closed position, and which can be quickly and easily opened to operative position.

While a preferred embodiment of the invention has been shown and described, various other embodiments and modifications thereof will be apparent to those skilled in the art and will fall within the scope of invention as defined in the following claims.

What I claim is:

1. A portable phonograph comprising a normally upright housing resembling a suitcase, said housing including a case having front and rear sides and an opening in the front side thereof, a record player tiltably mounted in said case on pivots spaced inwardly from the front side of said case, said record player being pivotable about a horizontal axis between a substantially vertical storage position in said case and a horizontal open position for use, said pivots located inwardly from the front side of the case and in a lower half of said case so that the record player pivots downwardly for movement from its vertical storage position to its horizontal open position, said record player being located to close said opening and form part of said housing when in said vertical position and being located partially within said casing and partially extending outwardly from the opening in the front side of said casing when the record player is in the horizontal open position, and a pair of loudspeaker enclosures respectively hinged to said case at opposite ends thereof, said enclosures being each arranged to pivot about an associated vertical axis disposed adjacent the front side of said case, each of said loudspeaker enclosures being pivotally movable about its axis between an operative position facing forwardly and a closed position contiguous to an associated end of said case, said loudspeaker enclosures being arranged in flanking relationship to said record player when said record player is in the open position and said enclosures are in their operative positions, whereby the pivoted arrangement of said record player and said loudspeaker enclosures with respect to said case provides a portable phonograph of extremely compact construction.

2. A phonograph as claimed in claim 1 in which said record player comprises a pivoted supporting base and a record player mechanism carried by said base, said base being tapered in such a direction that the front end of the base, when the record player is in the horizontal open position, is relatively thinner vertically than the rear end of the base.

3. A portable phonograph comprising a normally upright housing resembling a suitcase, means associated with said housing to readily carry said phonograph when said housing is in its normal upright position, said housing including a box shaped case having front and rear sides and a top thereof, an opening at the front side and a front portion of the top of said case, a record player tiltably mounted in said case on pivots spaced inwardly from the front side of said case, said record player being pivotable about a horizontal axis between a substantially vertical storage position in said case and a horizontal open position for use, said pivots located inwardly from the front side of the case and in a lower half of said case so that the record player pivots downwardly for movement from its vertical storage position to its horizontal open position, for said vertical storage position said player being located to close said opening and form part of said housing, for said horizontal open position said player being located partially within said casing and partially extending outwardly from the opening in the front side of said casing, said player being in either the horizontal usable position or the vertical storage position while said housing is arranged in normally upright fashion, a pair of loudspeaker enclosures respectively hinged to said case at opposite ends thereof, said enclosures being each arranged to pivot about an associated vertical axis disposed adjacent the front side of said case, each of said loudspeaker enclosures being pivotally movable about its axis between an operative position facing forwardly and a closed position contiguously conformant to an end of said case, said loudspeaker enclosures being arranged in flanking relationship to said record player when said record player is in the open position and said enclosures are in their operative positions, whereby the pivoted arrangement of said record player and said loudspeaker enclosures with respect to said case provides a portable phonograph having a relatively small front to rear dimension when said record player is in its horizontal open position.

4. A phonograph is claimed in claim 3, including amplifier means positioned in said case adjacent to and beneath the top thereof, said amplifier means being provided with control means positioned to be accessible through said opening when the record player is in said open position.

5. A phonograph as claimed in claim 4, in which said record player comprises a pivoted supporting base and a record player mechanism carried by said base, said base being tapered in such a direction that the front end of the base, when the record player is in the horizontal open position, is relatively thinner vertically than the rear end of the base, thereby enabling the tapered base to cooperate with said amplifier means.

6. A portable phonograph comprising a housing, said housing including a case having front and rear sides and an opening in the front side thereof, a record player pivotally mounted in said case on pivots spaced inwardly from the front side of said case, said record player being pivotable about a horizontal axis between a substantially vertical storage position in said case and a horizontal open position for use, said pivots located substantially inwardly from the front side of the case and in a lower half of said case so that the record player pivots downwardly for movement from its vertical storage position to its horizontal open position, said record player being located to close said opening and form part of said housing when in said vertical position and being located partially within said casing and partially extending outwardly from the opening in the front side of said casing when the record player is in the horizontal open position, amplifier means positioned rearwardly of the front side of, adjacent to and beneath the top of said case, said record player including a pivoted supporting base and a record player carried thereby, said base being tapered in such a direction that the front end of the base, when the record player is in the horizontal open position, is relatively thinner vertically than the rear end of the base, thereby enabling the front end of said base to fit into said case between said amplifier means and the front side of said case, whereby the arrangement of said record player and amplifier means in said housing provides a very compact phonograph construction.

7. The portable phonograph described in claim 6 wherein the pivoted supporting base for the record player includes a rear portion of sufficient vertical thickness to accommodate a phonograph motor.

References Cited by the Examiner

UNITED STATES PATENTS

| | | | |
|---|---|---|---|
| 3,090,462 | 5/63 | Huff | 181—31.1 |

FOREIGN PATENTS

| | | |
|---|---|---|
| 834,595 | 3/52 | Germany. |
| 303,254 | 11/32 | Italy. |
| 539,883 | 2/56 | Italy. |
| 871,574 | 6/61 | Great Britain. |

NORTON ANSHER, *Primary Examiner.*

EMIL G. ANDERSON, *Examiner.*